US012793150B2

(12) United States Patent
Amerigian et al.

(10) Patent No.: US 12,793,150 B2
(45) Date of Patent: Nov. 10, 2026

(54) CARBON INTENSITY AND SITE SELECTION MAP

(71) Applicant: Gevo, Inc., Englewood, CO (US)

(72) Inventors: Zoe Amerigian, Denver, CO (US); David Chandler Mazour, Lincoln, NE (US)

(73) Assignee: Gevo, Inc., Englewood, CO (US)

( * ) Notice: Subject to any disclaimer, the term of this patent is extended or adjusted under 35 U.S.C. 154(b) by 113 days.

(21) Appl. No.: 18/611,006

(22) Filed: Mar. 20, 2024

(65) Prior Publication Data

US 2025/0299395 A1 Sep. 25, 2025

(51) Int. Cl.
*G06Q 50/02* (2024.01)
*G06F 16/29* (2019.01)
*G06T 11/65* (2026.01)

(52) U.S. Cl.
CPC ............. *G06Q 50/02* (2013.01); *G06F 16/29* (2019.01); *G06T 11/65* (2026.01)

(58) Field of Classification Search
CPC .......... G06T 11/60; G06F 16/29; G06Q 50/02
See application file for complete search history.

(56) References Cited

U.S. PATENT DOCUMENTS 11,194,983 B1 * 12/2021 Obeyesekere ........ G06T 19/006
2009/0164264 A1 * 6/2009 Zolezzi ................ G06Q 30/018 705/7.38
2019/0087757 A1 * 3/2019 Tyagi ....................... H02J 3/381
2021/0149930 A1 * 5/2021 Alvarez ............... G09B 29/007
2023/0057009 A1 * 2/2023 Nanduru ................. B63B 49/00
2023/0153752 A1 * 5/2023 Allred .............. G06K 19/06028 705/28
2023/0289911 A1 * 9/2023 Freier ............. G06Q 10/06393
2023/0384106 A1 * 11/2023 Fanning .................... B62J 45/20
2024/0257150 A1 * 8/2024 Sarma ..................... G06Q 10/04
2024/0273547 A1 * 8/2024 Kleppe ................ G06Q 30/018
2025/0013969 A1 * 1/2025 Sinha ............... G06Q 10/06395
2025/0061422 A1 * 2/2025 Athmer .................. G06Q 50/04

OTHER PUBLICATIONS

FracTracker Alliance, Carbon Capture and Storage Pipeline Proposals and Agricultural Productivity Across the Great Plains, https://www.arcgis.com/apps/webappviewer/index.html?appid=3735a0596ab44d5a91cb42e4c4398eb9&extent=-12459847.1067%2C4430901.6556%2C-8741950.0509%2C6512434.8099%2C102100, accessed as early as Apr. 2024, 1 page.
Climate Trace, https://climatetrace.org/map/6514591593061, 2023, 8 pages.
Glosis, https://data.apps.fao.org/glosis/?lang=en, 2024, 1 page.
(Continued)

*Primary Examiner* — Phi Hoang
(74) *Attorney, Agent, or Firm* — Theodore M. Magee; Westman, Champlin & Koehler, P.A.

(57) ABSTRACT

A method includes receiving a designation of an area on a displayed map and identifying a plurality of geographic regions that together span the area on the displayed map. For each geographic region, a carbon intensity for a crop grown in the geographic region is obtained to form a plurality of carbon intensities. The plurality of carbon intensities are used to determine a carbon intensity for the crop across the area and the carbon intensity for the crop across the area is displayed.

17 Claims, 11 Drawing Sheets

(56) References Cited

OTHER PUBLICATIONS

Liu, Environmental Research Letters, Open Access, Shifting agricultural practices to produce sustainable, low carbon intensity feedstocks for biofuel products, https://iopscience.iop.org/article/10.1088/1748-9326/ab794e/meta, vol. 15, 084014, 2020, 12 pages.
Qin et al., Global Change Biology, Bioenergy, Land management change greatly impacts biofuels' greenhouse gas emissions, https://onlinelibrary.wiley.com/doi/full/10.1111/gcbb.12500, vol. 10, pp. 370-381, 2018.
United States Department of Agriculture, National Agricultural Statistics Service, https://www.nass.usda.gov/Publications/AgCensus/2017/Online_Resources/Ag_Census_Web_Maps/index.php, 1 page, 2017.

* cited by examiner

CARBON INTENSITY AND SITE SELECTION MAP

BACKGROUND

Carbon intensity is a measure of the amount of greenhouse gases emitted to produce a product. Many manufacturers are interested in minimizing the carbon intensity of their products. As such, manufacturers are interested in locating their production facilities in areas where the crops their facilities need are grown with low carbon intensities.

The discussion above is merely provided for general background information and is not intended to be used as an aid in determining the scope of the claimed subject matter. The claimed subject matter is not limited to implementations that solve any or all disadvantages noted in the background.

SUMMARY

A method includes receiving a designation of an area on a displayed map and identifying a plurality of geographic regions that together span the area on the displayed map. For each geographic region, a carbon intensity for a crop grown in the geographic region is obtained to form a plurality of carbon intensities. The plurality of carbon intensities is used to determine a carbon intensity for the crop across the area and the carbon intensity for the crop across the area is displayed.

In accordance with a further embodiment, a method includes defining a map of an area, the map having boundary lines for a plurality of geographic regions within the area and for each geographic region, defining a display characteristic such that the display characteristic is dependent on a carbon intensity of growing a crop in the geographic region. The display characteristics of the plurality of geographic regions are used to render the map such that at least two geographic regions with different carbon intensities appear different from each other in the rendered map.

In accordance with a still further embodiment, a method includes determining an actual carbon intensity for a county based on county-wide data and then determining a carbon intensity for a particular farm in the county. The actual carbon intensity for the farm is then used to calibrate the carbon intensity for the county.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
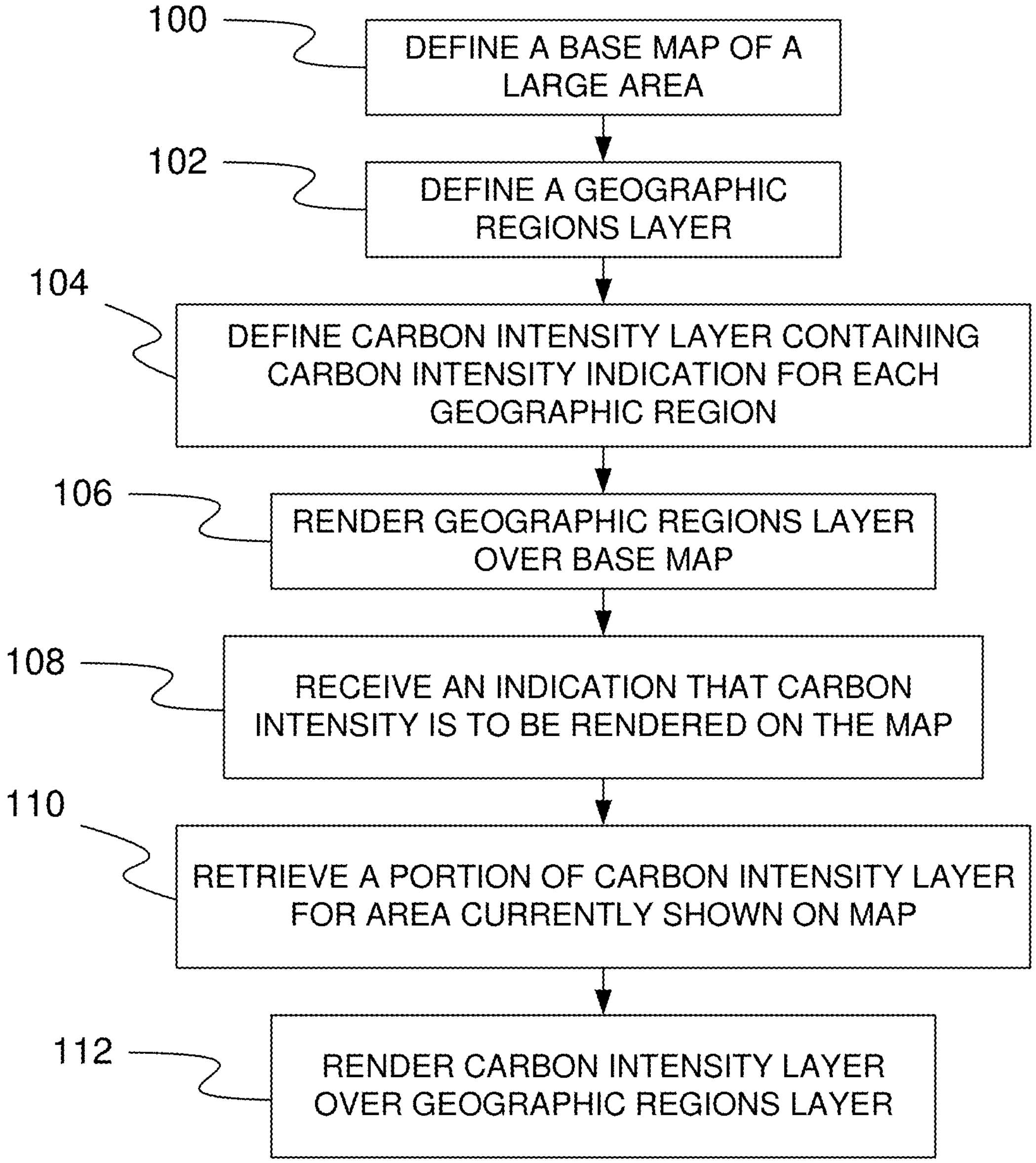
FIG. 1 is a flow diagram of a method of displaying carbon intensities of geographic areas.
Figure 2:
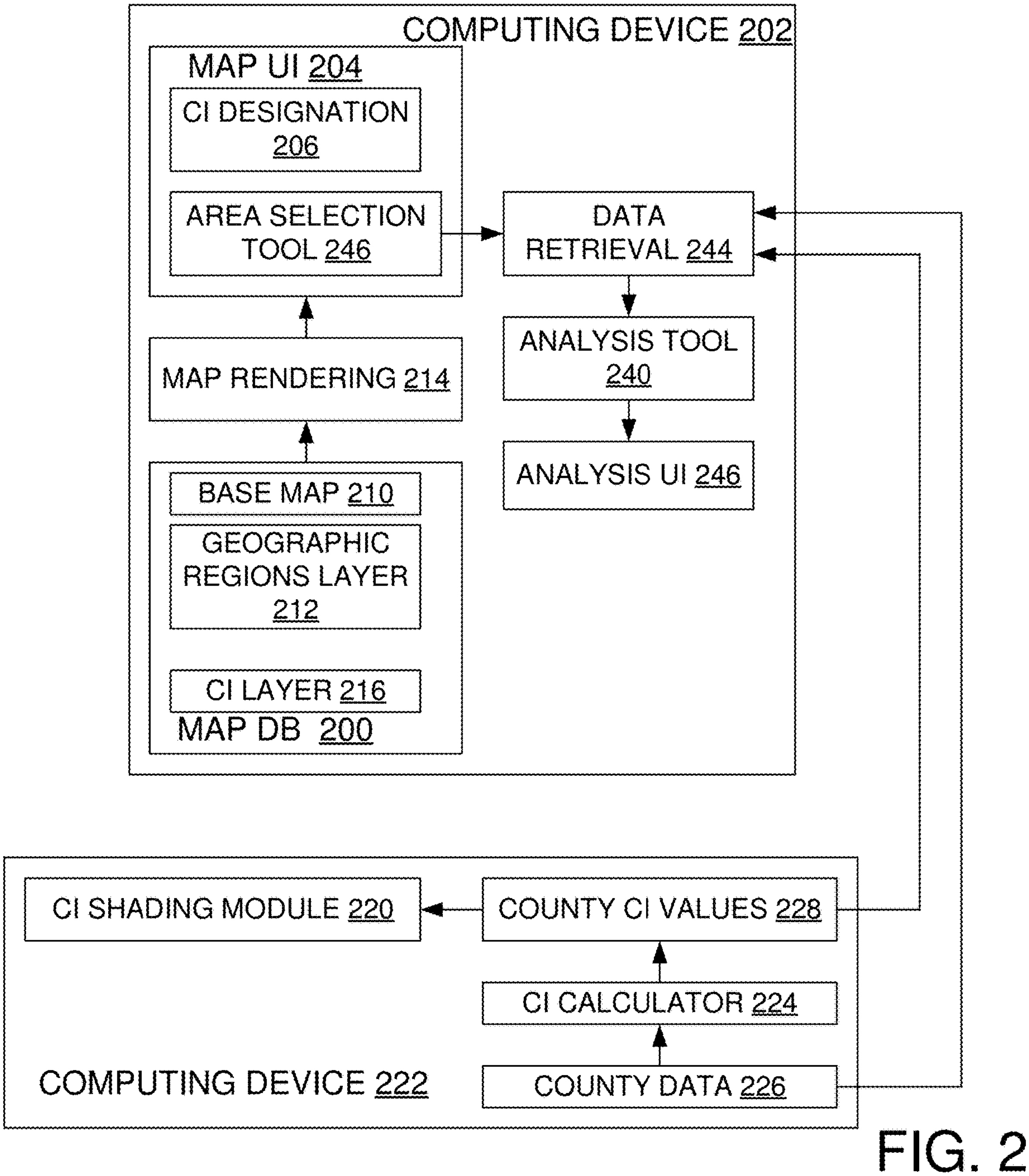
FIG. 2 is a block diagram of elements used to perform the method of FIG. 1.

FIG. 1 provides a flow diagram of a method of conveying the relative Carbon Intensity of geographic areas. FIG. 2 provides a block diagram of elements used in the method of FIG. 1.

In step 100, a base map 210 of a large area is defined in a map database 200 stored on a computing device 202. In step 102, a geographic regions layer 212 that overlays base map 210 is defined that provides the positions of boundary lines between smaller geographic regions within the large area. In accordance with one embodiment, base map 210 provides a map of the United States and geographic regions layer 212 provides boundary lines for counties within each state in base map 210.

In step 104, a carbon intensity map layer 216 is defined that contains a respective carbon intensity indication for each smaller geographic region. In accordance with one embodiment, the carbon intensity indication is a respective fill color applied within the boundaries of the smaller geographic regions.

Figure 3:
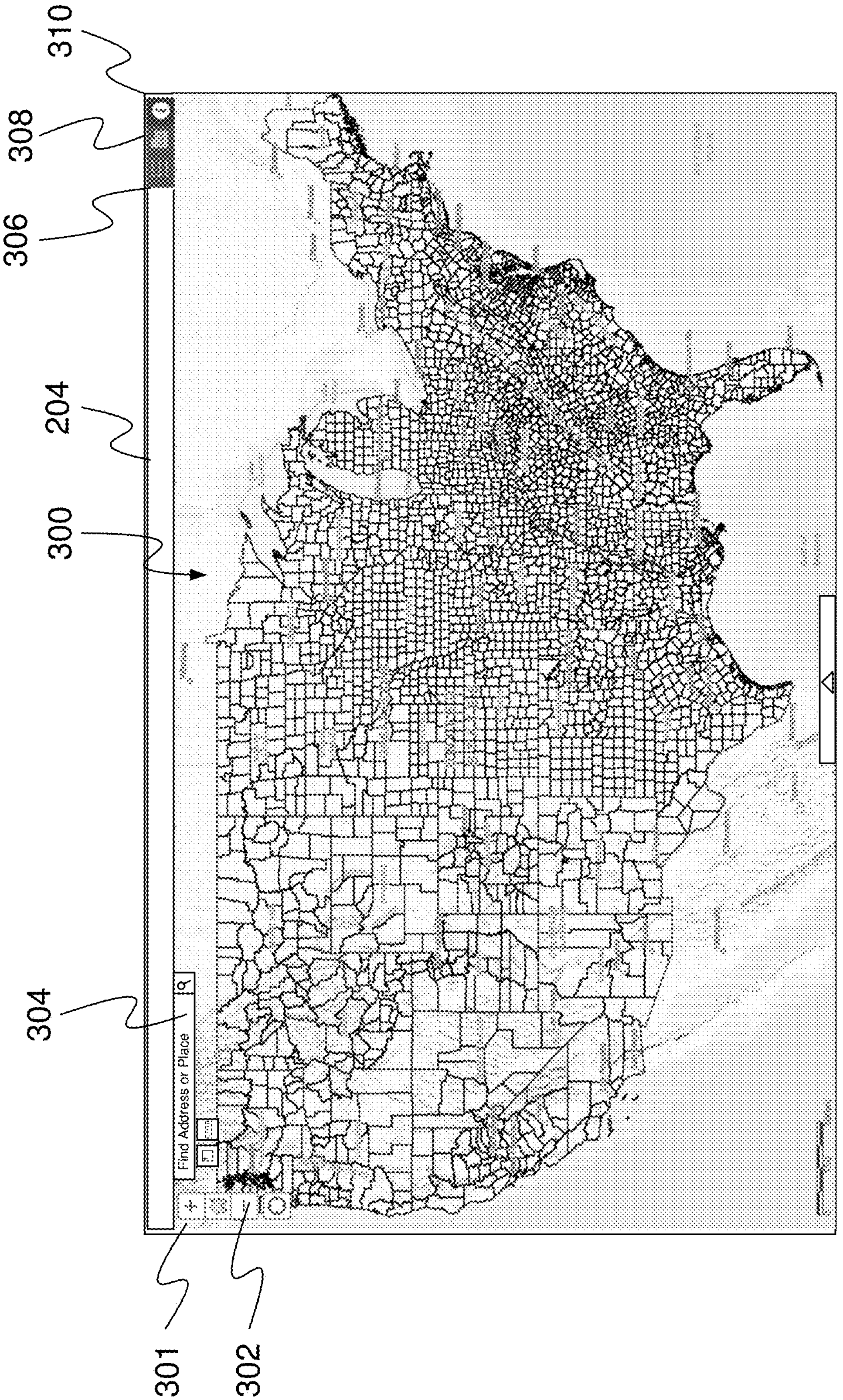
FIG. 3 is an example of a rendered map before carbon intensity information has been added to the map.

Base map 210 and geographic regions map 212 are rendered on a map user interface 204 by a map rendering module 214 at step 106. FIG. 3 provides an example of map user interface 204 showing a geographic regions map 212 rendered over a base map 210. In particular, FIG. 3 shows boundary lines for counties in each state in the United States rendered over a base map of the United States. Map user interface 204 of FIG. 3 also includes scale controls 301 and 302, location text box 304, legend control 306, layers control 308 and information control 310. Scale controls 301 and 302 allow the user to expand and reduce the size of map 300. Location text box 304 allows the user to enter a location using either a familiar name for the location or longitude and latitude coordinates for the location. Selecting search control 305 after entering the location in box 304 will cause map 300 to become centered on the location and the scale of the map will be expanded to better show the location. Legend control 306 will display a map legend showing the meaning of symbols on the map when selected. Layer control 308 will provide a panel containing a list of layers that are available for display on map 300 as discussed further below. Information control 310 provides a panel containing an area analysis tool for analyzing carbon intensity over multiple counties, descriptions of each available layer and the layers' data sources, a description of how carbon intensities are calculated for map 300, helpful data points and conversions and any alerts or other notices about updates to map user interface 204.

Figure 4:
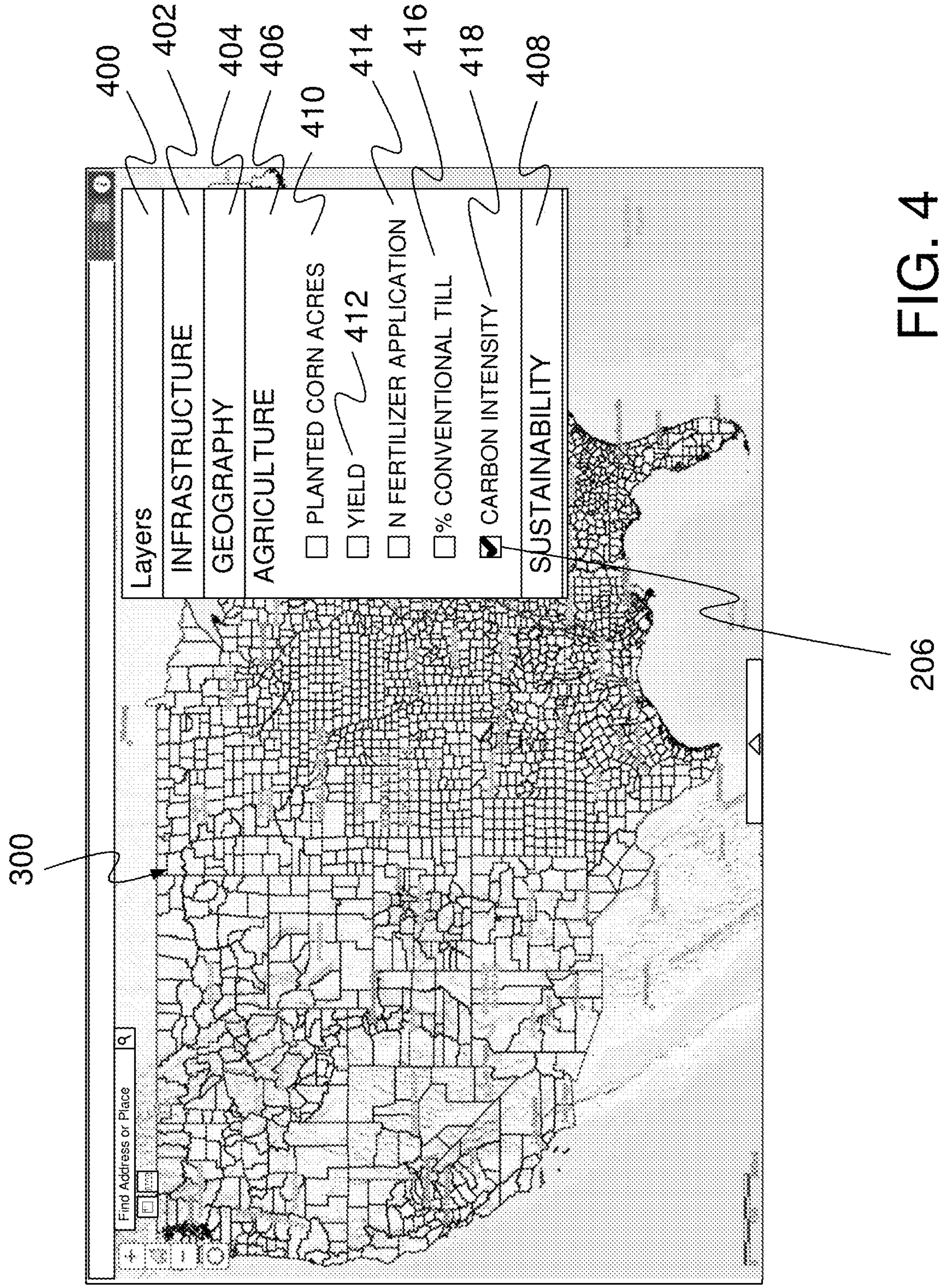
FIG. 4 shows a user interface including a panel for designating that carbon intensities are to be shown on the map.

At step 108, an indication that the carbon intensities of the smaller geographic regions in map 300 are to be rendered on map user interface 204 is received. In accordance with one embodiment, this indication is received from a carbon intensity designation tool 206 on map user interface 204. To reach carbon intensity designation tool 206, layers control 308 is first selected causing panel 400 to be displayed over map 300 as shown in FIG. 4.

Panel 400 includes a list of layers headings such as infrastructure layers heading 402, geography layers heading 404, agriculture layers heading 406 and sustainability layers heading 408. In FIG. 4, agriculture layers heading 406 has been selected causing the agriculture layers available under heading 406 to be shown. These agriculture layers include planted corn acres 410, yield 412, N fertilizer application 414, % conventional till 416 and carbon intensity 418. In the embodiment of FIG. 4, only one agriculture layer may be selected at a time using one of the designation controls such as designation control 206. When a designation control is selected, a check appears next to the selected agriculture layer and map user interface 204 returns an indication to map rendering module 214 that the selected agriculture layer should be displayed.

After receiving an indication that the carbon intensity designation tool 216 has been selected at step 108, map rendering module 214 retrieves a portion of the carbon intensity layer 216 from map database 200 at step 110. The retrieved portion corresponds to the area of the map currently being rendered on map user interface 204. Map rendering module 214 then renders the retrieved portion of carbon intensity layer 216 on the map user interface 204 at step 112. In some embodiments, carbon intensity layer 216 includes pop-up windows for each geographic region that are rendered on the display when a user selects a geographic region. In such embodiments, the pop-up window includes a numerical value for the carbon intensity of the geographic region.

Figure 5:
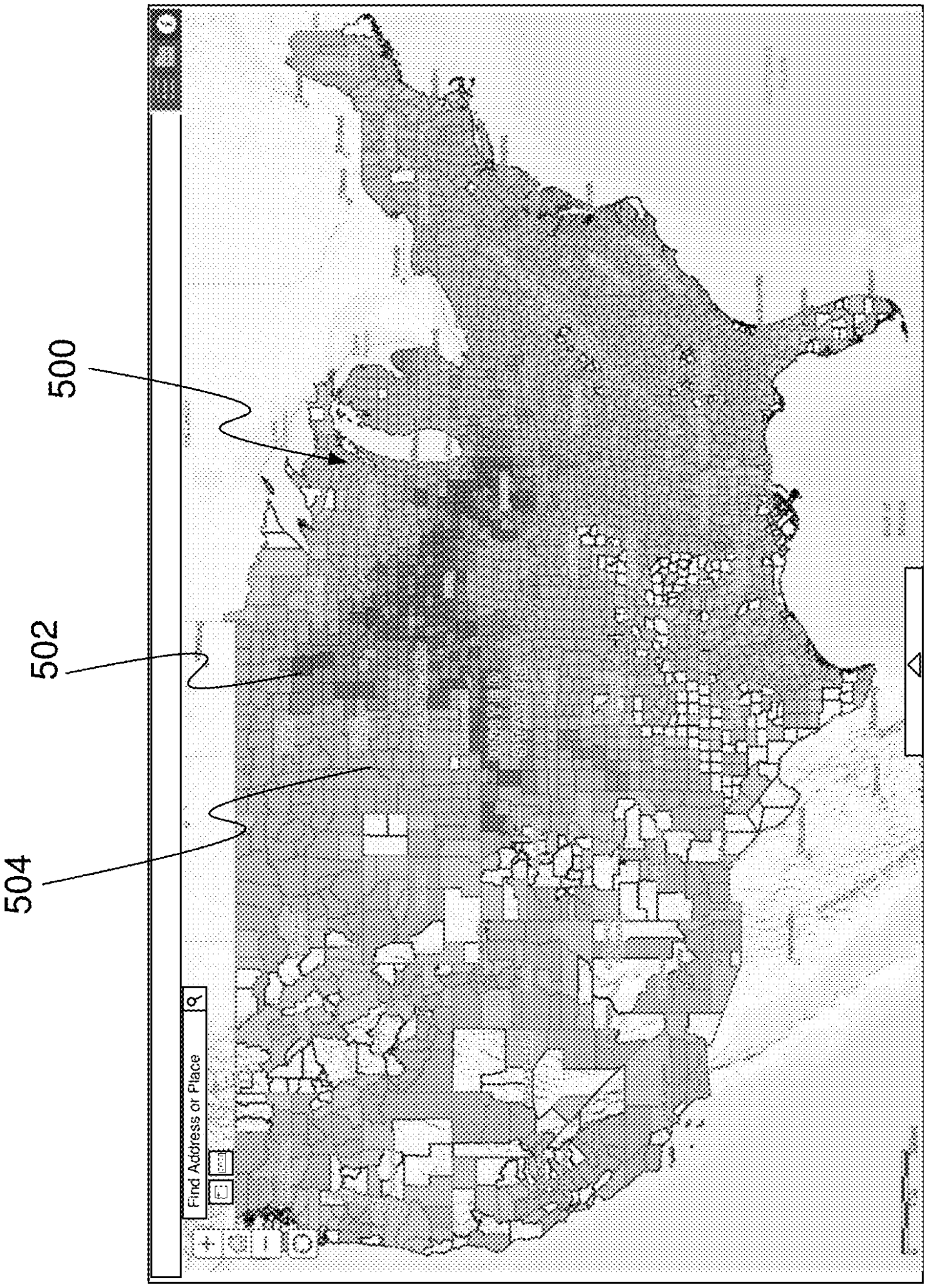
FIG. 5 is an example of a rendered map that uses shading to indicate the relative carbon intensity of counties in the United States.

FIG. 5 provides an example of a carbon intensity layer 500 rendered over a map of the United States. Carbon intensity layer 500 consists of a respective fill color for each county in the United States. For counties that do not grow corn, the fill color is set to white. For all other counties, the fill color is a shade of a base color such as green, brown, red, or blue, where the shade for a county is based on the average carbon intensity for growing corn in the county. For example, county 502 of FIG. 5 has a darker fill shade than county 504 indicating that the carbon intensity of growing corn in county 504 is less than the carbon intensity of growing corn in county 502.

Note that the shading provided in map 500 conveys the relative carbon intensity of different counties to the user quickly. This allows the user to make a faster decision about which counties would provide the best locations for corn processing plants if the carbon intensity of products formed from corn is to be limited as much as possible.

In addition to displaying the carbon intensity of a county, other information can be rendered by selecting other items in layers 402, 404, and 408. For example, a representation of a value of at least one attribute used to determine the carbon intensity in each geographic region, a representation of a sustainability measure for each geographic region, the locations of carbon capture infrastructure and the locations of transportation means can be displayed on the map.

Figure 6:
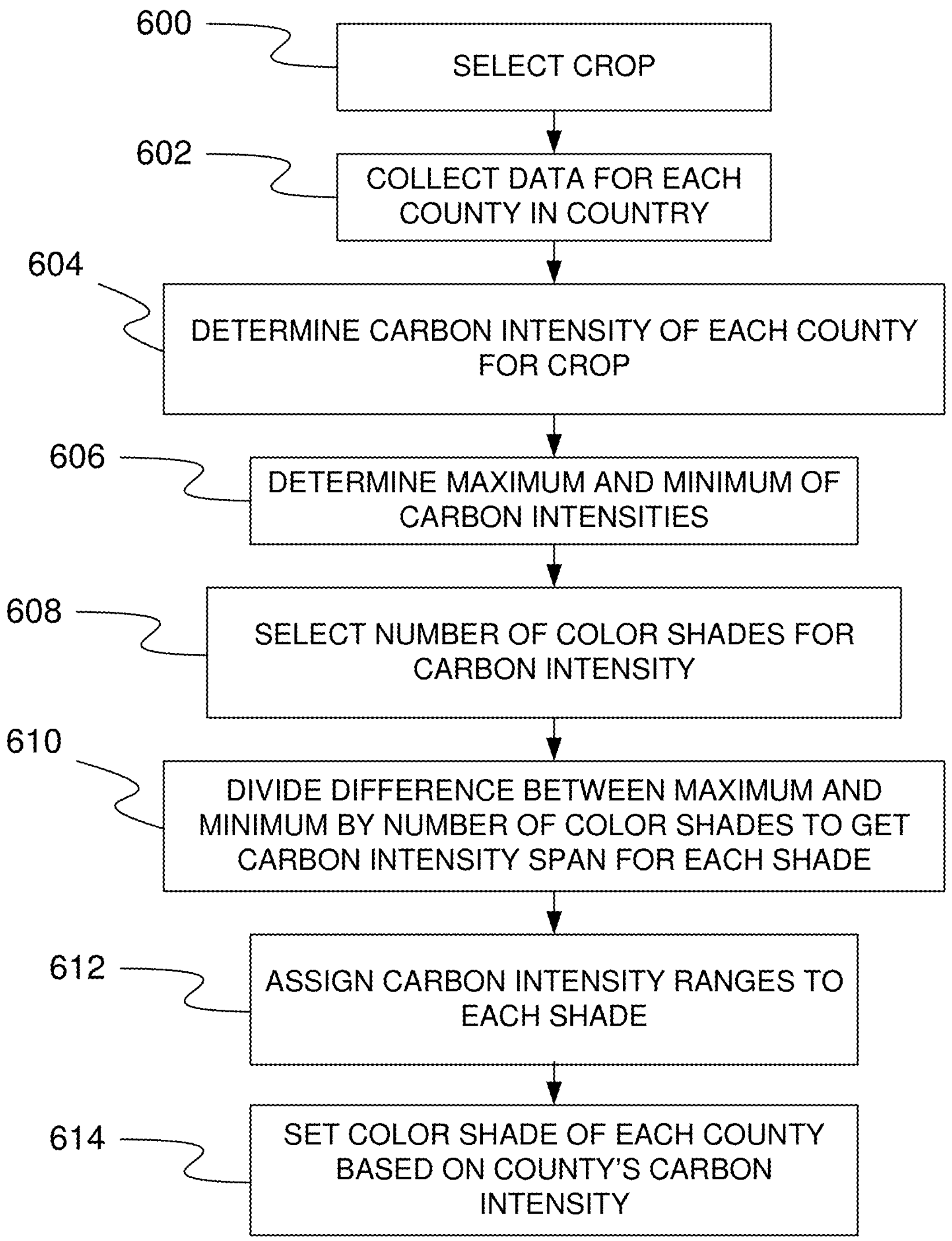
FIG. 6 is a flow diagram of a method of setting color shades for counties based on carbon intensity values for the counties.

In accordance with one embodiment, carbon intensity layer 216 is formed by a carbon intensity shading module 220 that is executed on a computing device 222 through the method of FIG. 6. In step 600, a crop is selected for computing the carbon intensity. Different crops will have different average carbon intensities within a county. In the examples provided herein, corn has been selected as the crop, however other crops are used in other implementations of the embodiments.

At step 602, a county carbon intensity calculator 224 executed by computing device 222, collects county data 226 for each county in the country. County data 226 includes all values used to determine an average carbon intensity for growing the selected crop in the county. Examples of county data 226 include average yield for the crop in the county, average fertilizer application rates, adoption rates of select sustainable agriculture practices and soil carbon emission factors. The specific data in county data 226 is based on the model used to compute carbon intensity such that different data types will be used for different models.

At step 604, county carbon intensity calculator 224 applies county data 226 to a model to determine a carbon intensity value 228 for growing the selected crop in each county in the country.

At step 606, a carbon intensity shading module 220 identifies the maximum and minimum carbon intensity for the country in county carbon intensity values 228. At step 608, shading module 220 selects a number of different shades of color that are to be rendered in carbon intensity layer 216 and at step 610, shading module 220 divides the difference between the maximum and minimum carbon intensity values by the number of different shades of color to determine the span of carbon intensity values for each shade.

At step 612, ranges of carbon intensity are assigned to each shade of color such that each range has the same span determined in step 610. At step 614, the ranges of carbon intensity assigned to each shade of color are used to assign a shade of color to each county. Specifically, the carbon intensity of the county is used to determine which range the county falls within and that range's associated color shade is assigned to the county to produce carbon intensity layer 216.

Other techniques for assigning colors based on carbon intensity values are used in other embodiments. For example, a two-color system can be used in which a county is assigned one color when the county's carbon intensity is above a national average and a second color when the county's carbon intensity is below the national average. In other embodiments, a three-color system is used where counties with carbon intensities that are within twenty five percent of a baseline value are a first color, counties with carbon intensities below the first group are a second color, and counties with carbon intensities above the first group are a third color.

In accordance with one embodiment, map user interface 204 is used in conjunction with an analysis tool 240 to provide a carbon intensity for any selected area displayed on map user interface 204.

Figure 7:
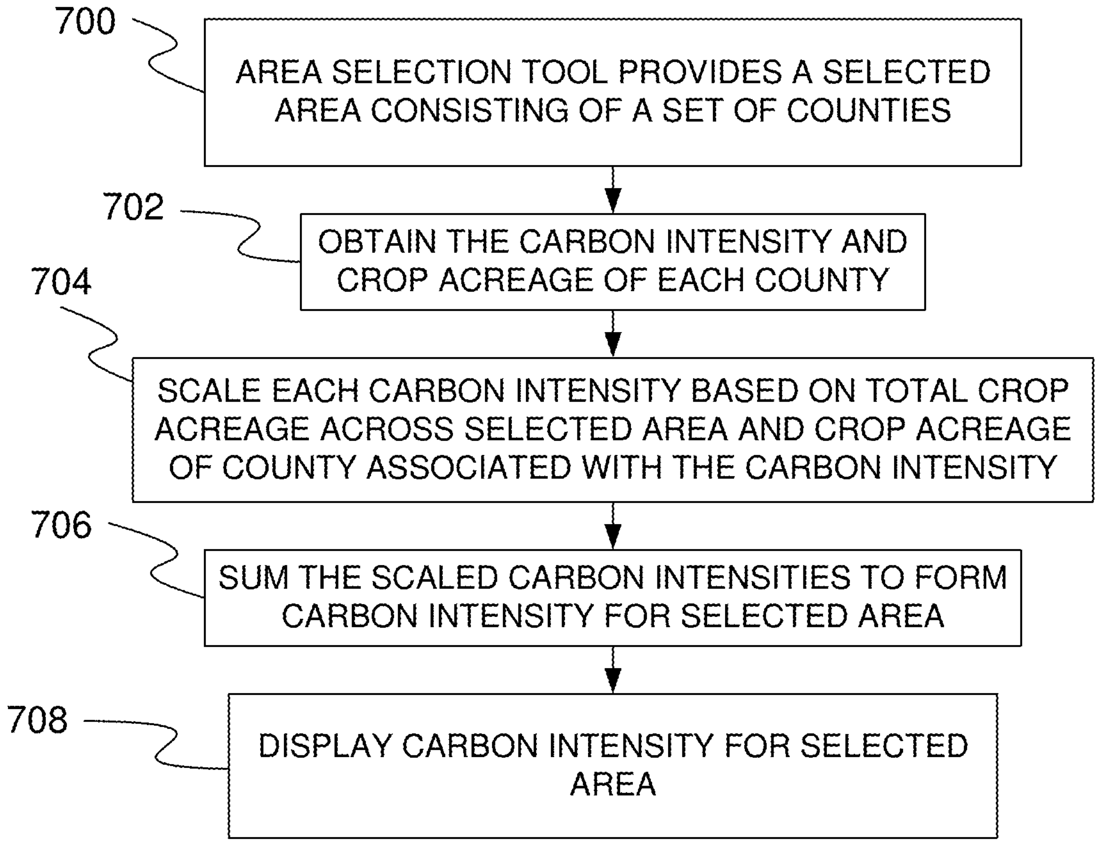
FIG. 7 is a flow diagram of a method of determining a carbon intensity for an area selected on a rendered map.
Figure 8:
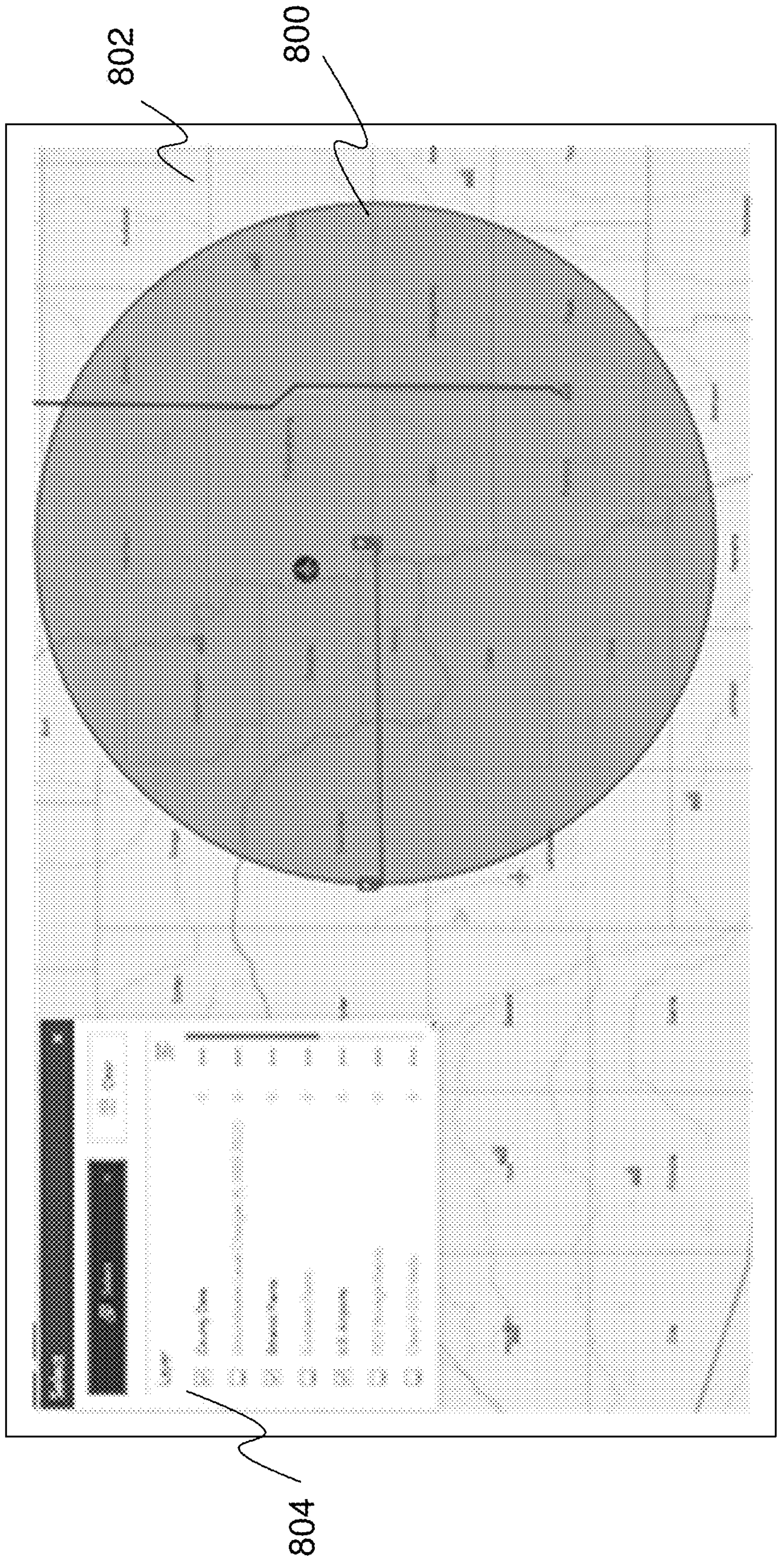
FIG. 8 is an example of a user interface used to select an area on a map.

FIG. 7 provides a flow diagram of a method of generating a carbon intensity for a selected area in a map interface. In step 700, an area selection tool 242 provides a selection of an area consisting of a set of geographic regions in the country such as a selection of a group of counties. In accordance with various embodiments, area selection tool 242 is a graphical tool that a user manipulates to draw a shape on the map rendered on map user interface 205. For example, in FIG. 8, area selection tool 242 has been used to draw a circle 800 on a portion of a rendered map 802. As shown in panel 804, the user can alternatively select graphical tools that will draw a rectangle or arbitrary shape on map 802. In accordance with one embodiment, each geographic region that is partially or fully within the drawn area is considered to be selected in step 700.

At step 702, area selection tool 242 passes identifiers of the selected geographic regions to a data retrieval module 244, which uses the identifiers to retrieve carbon intensity values for the geographic regions from county carbon intensity values 228 and to retrieve the crop acreage of each geographic region from county data 226. Data retrieval module 244 provides the retrieved values to analysis tool 240, which scales each carbon intensity value using the ratio of the crop acreage of the county associated with the carbon intensity value over the total crop acreage across the selected area (the sum of the acreages of each county in the selected area) at step 704. For example, if there were three counties in the selected area with respective carbon intensities CI1, CI2 and CI3 and acreages A1, A2 and A3, the following scaled carbon intensities would be determined: SCI1=CI1*A1/(A1+A2+A3); SCI2=CI2*A2/(A1+A2+A3); and SCI3=CI3*A3/(A1+A2+A3).

At step 706, analysis tool 240 sums the scaled carbon intensities to form a carbon intensity for the selected area and at step 708, analysis tool 240 forms an analysis user interface 246 that displays the carbon intensity for the area. Analysis user interface 246 may be separate from map user interface 204 or may be part of map user interface 204. For example, the carbon intensity for the area may be displayed in a panel next to a map showing the counties that form the selected area.

The ability to provide the carbon intensity for a selected area marks a significant improvement in the technology of site selection. In the past, a user attempting to select a site for a facility that will process corn into a product did not have the ability to quickly discover the carbon intensity of corn that would be grown near one or more proposed sites. As such, users found it difficult to compare possible sites for such processing facilities. By providing an easy and efficient technique for the user to discover the carbon intensity of corn grown near any location selected by the user, the embodiments improve the operation of the computing devices used by the user.

The county-wide data used to compute the county carbon intensity values can be inaccurate at times due to limited and/or erroneous responses to government or academic surveys. As a result, the computing systems that generate county carbon intensity values can produce inaccurate carbon intensity values. To improve these computing systems, some embodiments provide a method of correcting erroneous carbon intensity values.

Figure 9:
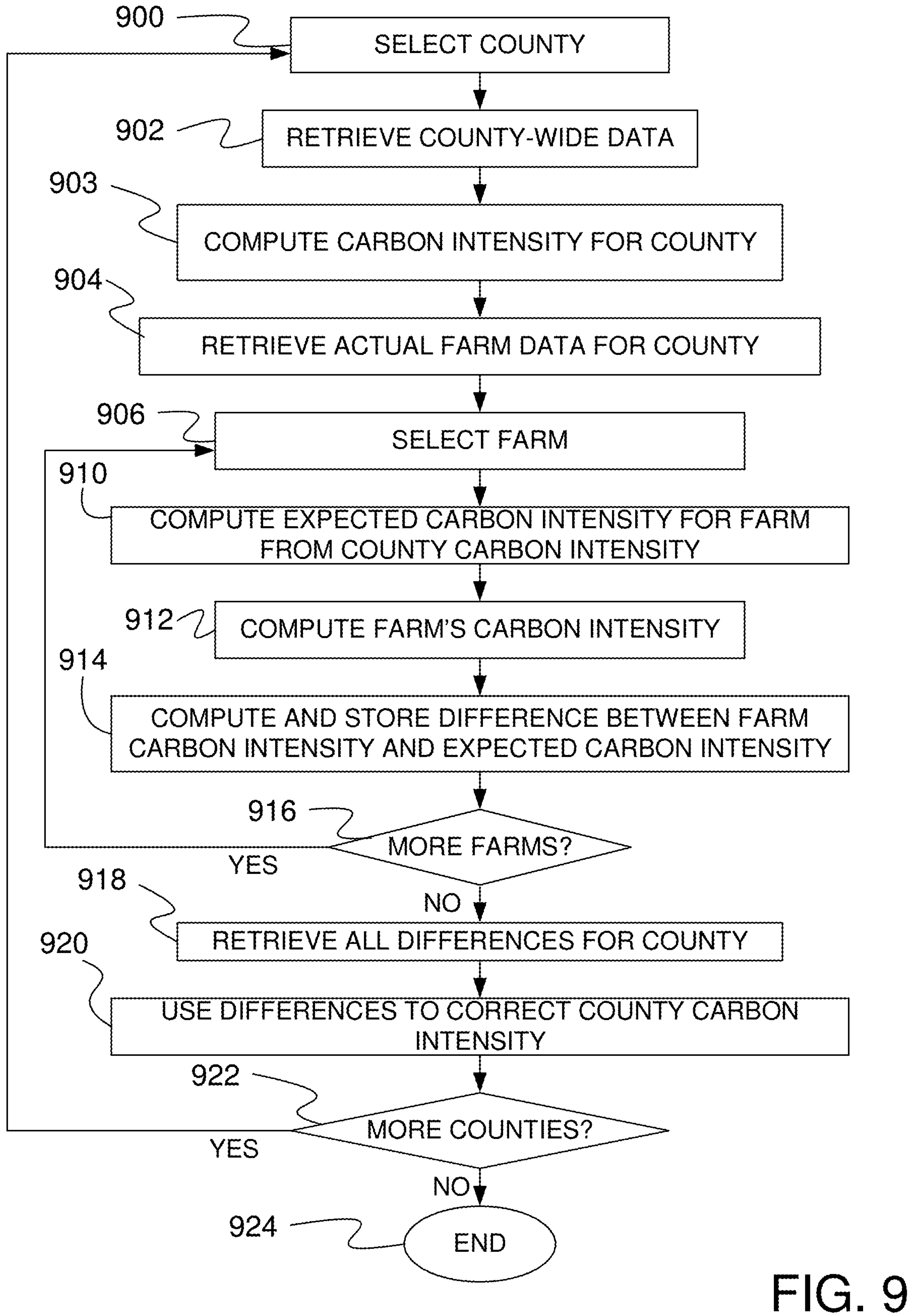
FIG. 9 is a flow diagram of a method of correcting a carbon intensity for a county based on actual data from a plurality of farms in the county.
Figure 10:
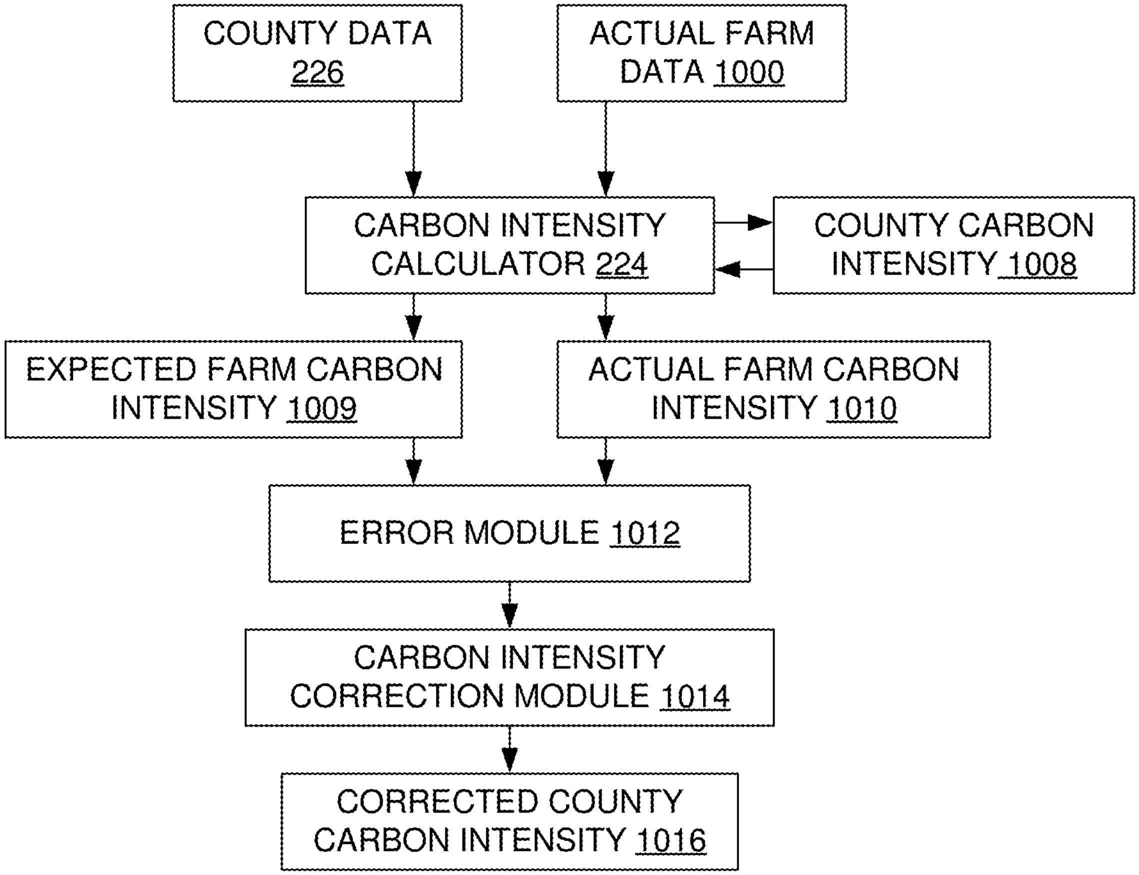
FIG. 10 is a block diagram of elements used in the method of FIG. 9.

FIG. 9 provides a flow diagram of the method of correcting carbon intensity values and FIG. 10 provides a block diagram of computing modules and data used by a computing device to practice the method of FIG. 9.

In step 900, a carbon intensity calculator 224 selects a county and at step 902 retrieves county-wide data for the selected county from county data 226. At step 903, carbon intensity calculator 224 uses the county-wide data to determine an average carbon intensity 1008 for the farms of the county.

At step 904, carbon intensity calculator 224 obtains actual farm data 1000 for at least one farm in the selected county. Actual farm data 1000 differs from county data 226 in that actual farm data 1000 is more complete and more accurate than county data 226. In general, actual farm data 1000 is produced through a combination of sensor data and farmer-reported values whereas county data 226 is based on an average of survey responses that can be affected by incomplete or erroneous responses.

In step 906, carbon intensity calculator 224 selects one of the farms in farm data 1000 and at step 910, determines an expected carbon intensity 1009 for the farm based on county carbon intensity 1008 determined in step 903. Expected carbon intensity 1009 can be described as the expected carbon intensity of a farm fitting a particular practice profile in a particular county based on county data 226. Expected carbon intensity 1009 can be the same as county carbon intensity 1008 or can be calculated from county carbon intensity 1008 based on the practices employed by the selected farm in actual farm data 1000. For example, if the farm uses techniques known to reduce carbon intensity, expected carbon intensity 1009 would be determined by applying a reduction factor to county carbon intensity 1008 that reflects the expected amount by which the selected farm's carbon intensity should be reduced relative to the county's carbon intensity given the farming practices of the selected farm.

At step 912, carbon intensity calculator 224 determines a farm carbon intensity 1010 for the selected farm using actual farm data 1000 for the selected farm. At step 914, an error module 1012 determines and stores the difference between farm carbon intensity 1010 and expected farm carbon intensity 1009.

At step 916, control returns to carbon intensity calculator 224 where it determines whether actual farm data 1000 contains data for another farm located in the selected county. When there is farm data 1000 for another farm, a different farm is selected by returning to step 906 and steps 910, 912, and 914 are repeated for the selected farm. Note that different selected farms can have different practice profiles such that different expected carbon intensities 1009 can be produced for different farms.

When all of the farms in the county with data in actual farm data 1000 have been processed, the method of FIG. 9 continues at step 918, where error module 1012 retrieves all of the differences between the expected farm carbon intensities 1009 and the actual farm carbon intensities 1010. At step 920, carbon intensity correction module 1014 uses the differences to correct the county carbon intensity to form a corrected county carbon intensity 1016. For example, in accordance with one embodiment, the differences are averaged to form a correction factor that is added to the county carbon intensity to produce the corrected carbon intensity.

At step 922, a determination is made as to whether there are additional counties to process. If there are additional counties to process, a new county is selected by returning to step 900 and the steps of FIG. 9 are repeated for the newly selected county. When all of the counties have been processed at step 922, the method of FIG. 9 ends at step 924.

Figure 11:
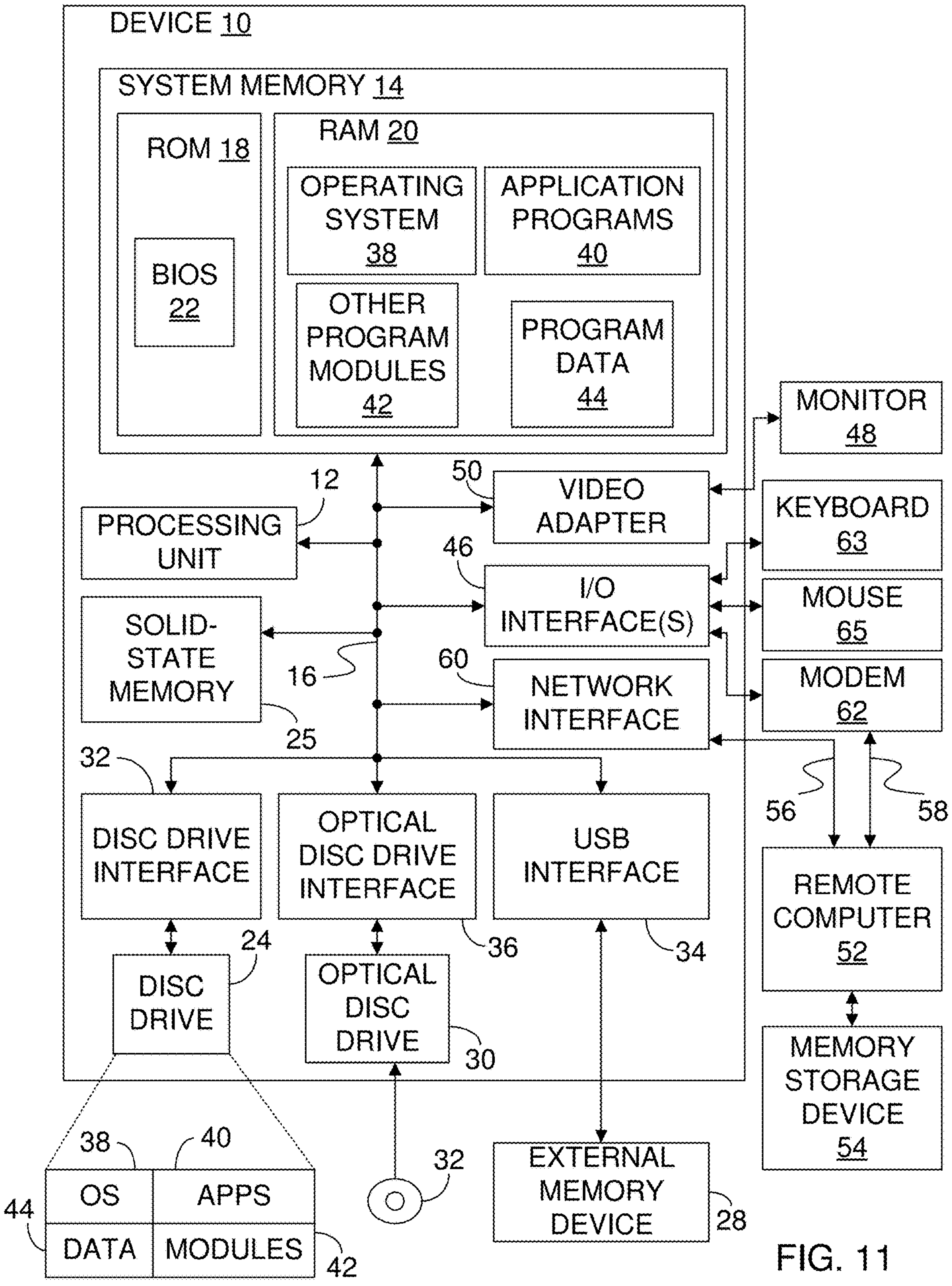
FIG. 11 is a block diagram of a computing device used to perform the various methods.

The system discussed above is implemented on one or more computing devices, an example of which is shown in FIG. 11. Computing device 10 of FIG. 11 includes a processing unit 12, a system memory 14 and a system bus 16 that couples the system memory 14 to the processing unit 12. System memory 14 includes read only memory (ROM) 18 and random-access memory (RAM) 20. A basic input/output system 22 (BIOS), containing the basic routines that help to transfer information between elements within the computing device 10, is stored in ROM 18. Computer-executable instructions that are to be executed by processing unit 12 may be stored in random access memory 20 before being executed.

Computing device 10 further includes an optional hard disc drive 24, an optional external memory device 28, and an optional optical disc drive 30. External memory device 28 can include an external disc drive or solid-state memory that may be attached to computing device 10 through an interface such as Universal Serial Bus interface 34, which is connected to system bus 16. Optical disc drive 30 can illustratively be utilized for reading data from (or writing data to) optical media, such as a CD-ROM disc 32. Hard disc drive 24 and optical disc drive 30 are connected to the system bus 16 by a hard disc drive interface 32 and an optical disc drive interface 36, respectively. The drives and external memory devices and their associated computer-readable media provide nonvolatile storage media for the computing device 10 on which computer-executable instructions and computer-readable data structures may be stored. Other types of media that are readable by a computer may also be used in the exemplary operation environment.

A number of program modules may be stored in the drives and RAM 20, including an operating system 38, one or more application programs 40, other program modules 42 and program data 44. In particular, application programs 40 can include programs for implementing any one of the modules and methods discussed above. Program data 44 may include any data used by the systems and methods discussed above.

Processing unit 12, also referred to as a processor, executes programs in system memory 14 and solid-state memory 25 to perform the methods described above.

Input devices including a keyboard 63 and a mouse 65 are optionally connected to system bus 16 through an Input/Output interface 46 that is coupled to system bus 16. Monitor or display 48 is connected to the system bus 16 through a video adapter 50 and provides graphical images to users. Other peripheral output devices (e.g., speakers or printers) could also be included but have not been illustrated. In accordance with some embodiments, monitor 48 comprises a touch screen that both displays input and provides locations on the screen where the user is contacting the screen.

The computing device 10 may operate in a network environment utilizing connections to one or more remote computers, such as a remote computer 52. The remote computer 52 may be a server, a router, a peer device, or other common network node. Remote computer 52 may include many or all of the features and elements described in relation to computing device 10, although only a memory storage device 54 has been illustrated in FIG. 11. The network connections depicted in FIG. 11 include a local area network (LAN) 56 and a wide area network (WAN) 58. Such network environments are commonplace in the art.

The computing device 10 is connected to the LAN 56 through a network interface 60. The computing device 10 is also connected to WAN 58 and includes a modem 62 for establishing communications over the WAN 58. The modem 62, which may be internal or external, is connected to the system bus 16 via the I/O interface 46.

In a networked environment, program modules depicted relative to the computing device 10, or portions thereof, may be stored in the remote memory storage device 54. For example, application programs may be stored utilizing memory storage device 54. In addition, data associated with an application program may illustratively be stored within memory storage device 54. It will be appreciated that the network connections shown in FIG. 11 are exemplary and other means for establishing a communications link between the computers, such as a wireless interface communications link, may be used.

Although elements have been shown or described as separate embodiments above, portions of each embodiment may be combined with all or part of other embodiments described above.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms for implementing the claims.

What is claimed is:

1. A method comprising:

receiving a designation of an area on a displayed map;

identifying a plurality of geographic regions that together span the area on the displayed map;

for each geographic region, obtaining a carbon intensity for a crop grown in the geographic region to form a plurality of carbon intensities;

using the plurality of carbon intensities to determine a carbon intensity for the crop across the area through steps comprising:

determining a total acreage of the crop grown across the area;

for each geographic region:

determining a total acreage of the crop grown in the geographic region;

using the total acreage of the crop grown across the area and the total acreage of the crop grown in the geographic region to scale the carbon intensity for the geographic region to form a scaled carbon intensity for the geographic region; and using the scaled carbon intensities for the geographic regions to form the carbon intensity for the crop across the area; and displaying the carbon intensity for the crop across the area.

2. The method of claim 1 wherein receiving a designation comprises receiving a circle around a facility site.

3. The method of claim 1 further comprising displaying a representation of a value of at least one attribute used to determine the carbon intensity in each geographic region in the displayed map.

4. The method of claim 1 further comprising displaying a representation of the carbon intensity for the crop for each geographic region on the displayed map.

5. The method of claim 4 wherein the representation comprises coloring each geographic region based on the carbon intensity for the crop in the geographic region.

6. The method of claim 1 further comprising displaying a representation of a sustainability measure for each geographic region on the displayed map.

7. The method of claim 1 further comprising displaying carbon capture infrastructure on the map.

8. The method of claim 1 further comprising displaying a transportation means on the map.

9. A method comprising:

defining a map of an area, the map having boundary lines for a plurality of geographic regions within the area;

for each geographic region, defining a display characteristic such that the display characteristic is dependent on a carbon intensity of growing a crop in the geographic region;

using the display characteristics of the plurality of geographic regions to render the map such that at least two geographic regions with different carbon intensities appear different from each other in the rendered map;

receiving a designation of a sub-area within the rendered map;

determining a carbon intensity for growing a crop in the sub-area based on a crop acreage in each geographic region within the sub-area and the carbon intensity of growing the crop in each geographic region within the sub-area through a process comprising:

for each geographic region within the sub-area:

modifying the carbon intensity of the geographic region based on the crop acreage of the geographic region to form a modified carbon intensity;

using the modified carbon intensities for the geographic regions to form a carbon intensity across the sub-area; and displaying the carbon intensity for the sub-area.

10. The method of claim 9 wherein the display characteristic of a geographic region is a color of an area in the rendered map that represents the geographic region.

11. The method of claim 9 wherein the map of the area comprises a map of a country.

12. The method of claim 9 wherein receiving the designation of the sub-area comprises receiving the designation of an area around a facility site.

13. The method of claim 12 wherein rendering the map further comprises:

obtaining the locations of transportation infrastructure; and displaying indicators of the locations on the rendered map.

14. The method of claim 12 wherein rendering the map further comprises:

obtaining the locations of facilities that process the crop; and displaying indicators of the locations of the facilities on the rendered map.

15. A method comprising:

receiving a designation of an area on a displayed map;

identifying a plurality of geographic regions that together span the area on the displayed map;

for each geographic region, obtaining a carbon intensity for a crop grown in the geographic region to form a plurality of carbon intensities;

for each geographic region, obtaining an acreage of the crop grown in the geographic region to form a plurality of crop acreages;

for each geographic region, modifying the carbon intensity of the geographic region based on the crop acreage of the geographic region to form a modified carbon intensity; and using the modified carbon intensities for the geographic regions to form a carbon intensity across the area; and displaying the carbon intensity for the crop across the area.

16. The method of claim 15 wherein modifying the carbon intensity of a geographic region comprises dividing the crop acreage of the geographic region by a crop acreage of the area to form a scaling factor and multiplying the scaling factor by the carbon intensity of the geographic region to form a scaled carbon intensity for the geographic region.

17. The method of claim 16 further comprising summing the scaled carbon intensities for the geographic regions to form the caron intensity across the area.

* * * * *